United States Patent [19]
Koue

[11] Patent Number: 5,781,626
[45] Date of Patent: Jul. 14, 1998

[54] COMMUNICATION DEVICE CAPABLE OF CONTROLLING TRANSMISSION PARAMETERS OF OUTPUTTED DTMF SIGNALS

[75] Inventor: Toshiaki Koue, Saitama, Japan

[73] Assignee: Fuji Xerox Co., Ltd., Tokyo, Japan

[21] Appl. No.: 842,087

[22] Filed: Apr. 28, 1997

Related U.S. Application Data

[63] Continuation of Ser. No. 424,612, Apr. 19, 1995, abandoned.

[30] Foreign Application Priority Data

Jul. 8, 1994 [JP] Japan .................................. 6-179793

[51] Int. Cl.⁶ .................................................. H04M 1/50
[52] U.S. Cl. ........................... 379/361; 379/93; 379/418
[58] Field of Search ............................... 379/58, 59, 92, 379/112, 235, 236, 237, 283, 286, 359, 360, 386, 361, 100, 257, 418, 93

[56] References Cited

U.S. PATENT DOCUMENTS

| | | | |
|---|---|---|---|
| 5,010,569 | 4/1991 | Katagawa | 379/283 |
| 5,020,099 | 5/1991 | Katagawa | 379/283 |
| 5,327,492 | 7/1994 | Parola | 379/283 |
| 5,369,697 | 11/1994 | Murray et al. | 379/359 |
| 5,416,835 | 5/1995 | Lee | 379/283 |
| 5,422,945 | 6/1995 | Wyatt | 379/283 |
| 5,530,743 | 6/1996 | Sakurai | 379/257 |

FOREIGN PATENT DOCUMENTS

| | | |
|---|---|---|
| 63-104572 | 5/1988 | Japan . |
| 63-300669 | 12/1988 | Japan . |
| 2-50560 | 2/1990 | Japan . |
| 3-260875 | 11/1991 | Japan . |
| 4-168862 | 6/1992 | Japan . |

OTHER PUBLICATIONS

"Technical Reference Material For Utilizing Telephone Network", Third Edition, The Telecommunications Association, p. 12, 1992.

"Technical Requirements for Terminal Equipment to be Linked to Analog Connection Points" (Parts 1 and 2), Federal Ministry of Posts and Telecommunications, FTZ 1TR2 vol. 1, p. 23, 1990.

"Technical Requirements for Connection of Single Line Equipment to the Hong Kong Public Switched Telephone Network (PSTN)" Customer Technical Guide No. 20, Issue 1, Hong Kong Telephone Company Limited, pp. 26–27, 1990.

*Primary Examiner*—Krista Zele
*Assistant Examiner*—Scott Wolinsky
*Attorney, Agent, or Firm*—Finnegan, Henderson, Farabow, Garrett & Dunner, L.L.P.

[57] ABSTRACT

A communication device, such as a telephone or a facsimile device, includes an input device for inputting code information for a call to be transmitted through a communication network, a transmitting device for transmitting dual-tone multiple frequency (DTMF) signals to the communication network according to the code information, and a transmission control device for controlling transmission parameters of a DTMF signal. At least one of a plurality of parameters, including signal transmission time, signal pause time, and signal transmission level, is made different by the transmission control device for a DTMF signal transmitted during the call by the transmitting device after the execution of a dialing input from the communication device to the communication network.

3 Claims, 5 Drawing Sheets

| DTMF CONTROL PARAMETERS A | DTMF CONTROL PARAMETER B | DTMF CONTROL PARAMETER C |
|---|---|---|
| SIGNAL TRANSMISSION TIME (100 MS) | SIGNAL TRANSMISSION TIME (70 MS) | SIGNAL TRANSMISSION TIME (150 MS) |
| SIGNAL PAUSE TIME (100 MS) | SIGNAL PAUSE TIME (70 MS) | SIGNAL PAUSE TIME (150 MS) |
| SIGNAL TRANSMISSION LEVEL (-3 dBm) | SIGNAL TRANSMISSION LEVEL (-3 dBm) | SIGNAL TRANSMISSION LEVEL (-5 dBm) |

| SELECTION SIGNAL PARAMETERS |
|---|
| SIGNAL TRANSMISSION TIME (60 MS) |
| SIGNAL PAUSE TIME (60 MS) |
| SIGNAL TRANSMISSION LEVEL (-7 dBm) |

| DTMF CONTROL PARAMETERS |
|---|
| SIGNAL TRANSMISSION TIME (100 MS) |
| SIGNAL PAUSE TIME (100 MS) |
| SIGNAL TRANSMISSION LEVEL (-3 dBm) |

FIG. 4

| DTMF CONTROL PARAMETERS A |
|---|
| SIGNAL TRANSMISSION TIME (100 MS) |
| SIGNAL PAUSE TIME (100 MS) |
| SIGNAL TRANSMISSION LEVEL (-3 dBm) |

| DTMF CONTROL PARAMETERS B |
|---|
| SIGNAL TRANSMISSION TIME (70 MS) |
| SIGNAL PAUSE TIME (70 MS) |
| SIGNAL TRANSMISSION LEVEL (-3 dBm) |

| DTMF CONTROL PARAMETER C |
|---|
| SIGNAL TRANSMISSION TIME (150 MS) |
| SIGNAL PAUSE TIME (150 MS) |
| SIGNAL TRANSMISSION LEVEL (-5 dBm) |

FIG. 5

COMMUNICATION DEVICE CAPABLE OF CONTROLLING TRANSMISSION PARAMETERS OF OUTPUTTED DTMF SIGNALS

This application is a continuation of application Ser. No. 08/424,612, filed Apr. 19, 1995, now abandoned.

BACKGROUND OF THE INVENTION

1. Field of the Invention

The present invention relates to a communication device connected to a communication network, and more particularly to a signal control system in a communication device having a function of transmitting a dual-tone multiple frequency signal.

2. Description of the Related Art

In recent years, there have been proposed various devices using a DTMF (dual-tone multiple frequency) signal, i.e., a so-called PB signal. For example, there has been proposed a facsimile device such that after it is connected to a remote device, a DTMF signal is used to control the remote device and allow instruction of confidential polling, confidential transmission, relayed broadcasting, etc. (Japanese Patent Laid-open Nos. 63104572, 63-300669, 2-50560, and 3-260875, for example). In most of the facsimile devices proposed in these literatures, the DTMF signal is transmitted by manual operation of an operator. Also proposed a technique of automatically transmitting the DTMF signal (Japanese Patent Laid-open No. 4-168862, for example).

In any facsimile device in the prior art as mentioned above, parameters such as a signal transmission time, a signal pause time, and a signal transmission level in dialing to a telephone network (exchange) are the same in specifications as parameters in transmitting a DTMF signal to a remote device. For example, if each of the signal transmission time and the signal pause time (minimum pause) of a signal to a telephone network in Japan is generally set to 60 ms as a standard, a dial signal will be properly received by transmitting the signal meeting this standard. However, there is a possibility that a DTMF signal cannot be properly detected by a remote device according to its capability (specifications) of receiving the DTMF signal. This possibility is remarkable when the remote device exists in a foreign country (i.e., the remote device is designed and manufactured in accordance with foreign specifications). For example, in Germany, both the signal transmission time and the signal pause time are standardized to 80 to 100 ms. Accordingly, a facsimile device meeting the German specifications cannot detect the signal with both the signal transmission time and the signal pause time set to 60 ms as mentioned above, and the control by DTMF is impossible.

Further, in some case, a DTMF signal transmitted cannot be properly received by a remote device because of attenuation, deterioration, and noise. FIG. 2 is a block diagram showing an example of a communication network. A dial signal is transmitted from a calling terminal 20 through a subscriber line to an exchange A 21 involving the calling terminal 20, and is received by the exchange A 21 (Section 1 shown in FIG. 2). On the other hand, a DTMF signal for controlling a called terminal 23 is transmitted from the exchange A 21 through a network to an exchange Z 22, and is further transmitted from the exchange Z 22 to the called terminal 23. Such a manner of transmission applies similarly to the case where an answer signal or the like is transmitted from the called terminal 23 to the calling terminal 20 (Section 2 shown in FIG. 2). Accordingly, the DTMF signal tends to undergo attenuation and deterioration greater than those of the dial signal, so that there is a possibility that the DTMF signal cannot be properly received by the called terminal 23.

SUMMARY OF THE INVENTION

It is accordingly an object of the present invention to provide a communication device which can reliably transmit a DTMF signal to a remote device.

According to a first aspect of the present invention, there is provided a communication device comprising means for inputting code information; means for transmitting a dual-tone multiple frequency signal according to the code information input; and means for controlling transmission so that at least one of a signal transmission time and a signal pause time of the dual-tone multiple frequency signal upon dialing to a communication network is made different from that upon any instance other than dialing to the communication network.

According to a second aspect of the present invention, there is provided a communication device comprising means for inputting code information; means for transmitting a dual-tone multiple frequency signal according to the code information input; and means for controlling transmission so that a signal transmission level of the dual-tone multiple frequency signal upon dialing to a communication network is made different from that upon any instance other than dialing to the communication network.

According to a third aspect of the present invention, the communication device described above further comprises means for storing a plurality of sets of parameters, each set of parameters comprising at least one of the signal transmission time, the signal pause time, and the signal transmission level of the dual-tone multiple frequency signal; and means for selecting one of the plurality of sets of parameters to be used.

In the communication device according to the first aspect of the present invention, the dual-tone multiple frequency signal can be transmitted to a remote device in a foreign country by using the parameters meeting the specifications for the foreign country which parameters are different from those upon dialing. Accordingly, the dual-tone multiple frequency signal can be reliably detected by the remote device.

In the communication device according to the second aspect of the present invention, the dual-tone multiple frequency signal can be transmitted with a proper level even though a communication network having a low-quality transmission channel. Accordingly, the dual-tone multiple frequency signal can be reliably detected by a remote device.

In the communication device according to the third aspect of the present invention, a plurality of sets of parameters corresponding to a plurality of remote devices at the receiving ends can be stored, and one of the plural sets of parameters to be used can be selected. Accordingly, the dual-tone multiple frequency signal can be transmitted to an arbitrary remote device by using an optimum set of parameters.

Thus, according to the present invention, the rate of success of dual-tone multiple frequency control can be improved to reduce invalid communication. Accordingly, the efficiency of communication can be improved by utilizing the dual-tone multiple frequency control function, and a communication cost can also be reduced.

Other objects and features of the invention will be more fully understood from the following detailed description and appended claims when taken with the accompanying drawings.

BRIEF DESCRIPTION OF THE DRAWINGS

FIG. 4 is an illustration of different sets of parameters as an example;

FIG. 5 is an illustration of a plurality of sets of DTMF control parameters as an example;

DETAILED DESCRIPTION OF THE PREFERRED EMBODIMENTS

Some preferred embodiments of the present invention will now be described with reference to the drawings.

Figure 1:
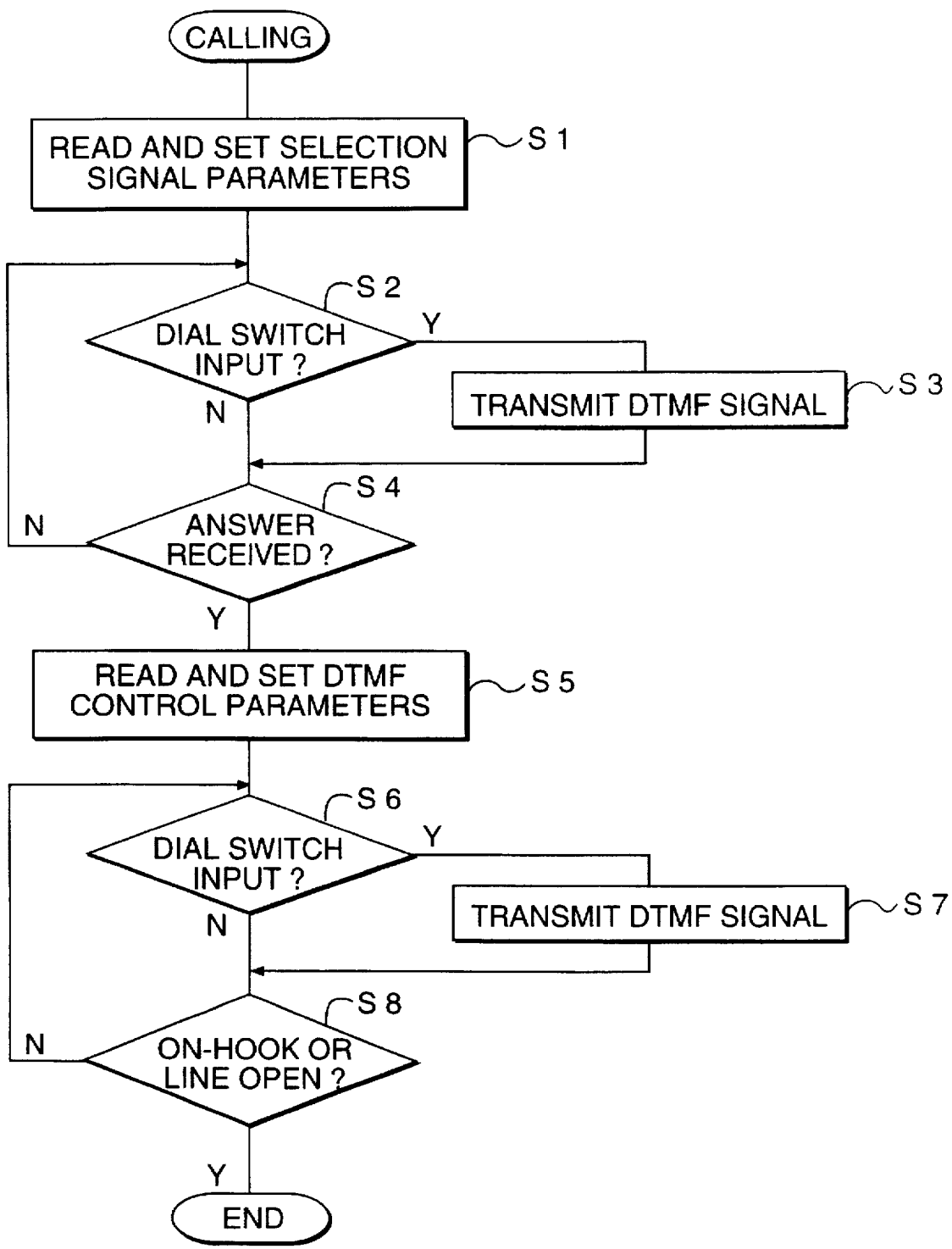
FIG. 1 is a flowchart showing the operation of a telephone according to a first preferred embodiment of the present invention.
Figure 2:
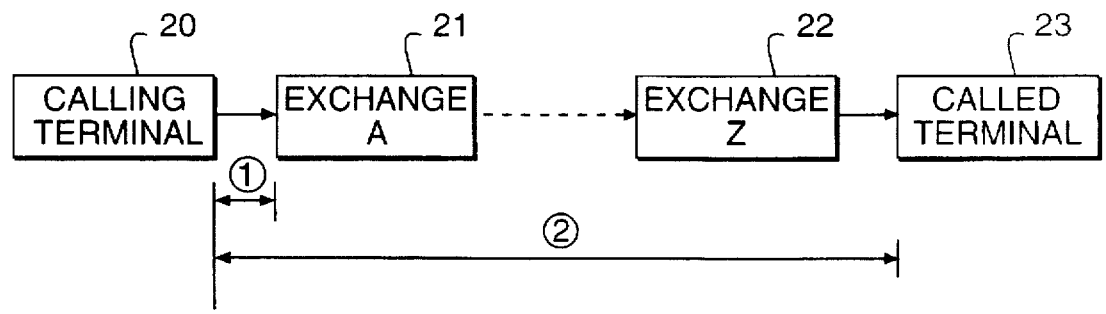
FIG. 2 is a block diagram showing an example of a communication network.

FIG. 1 is a flowchart showing the operation of a telephone according to a first preferred embodiment of the present invention. In step 50, a handset of a telephone is picked up by a user (off-hook operation), and a control device (not shown) of the telephone closes a line to originate a call. In step S1, the control device reads DTMF transmission parameters (signal transmission time, signal pause time, signal transmission level, etc.) for a selection signal (dial signal), and sets the parameters in a DTMF signal transmission circuit. An example of the selection signal parameters is shown in FIG. 4 at the left portion thereof. In step S2, the control device determines whether or not any one of dial switches has been depressed (input). If the answer in step S2 is yes, the program proceeds to step S3. In step S3, the DTMF signal transmission circuit transmits a DTMF signal corresponding to the depressed dial switch according to the selection signal parameters set above. In step S4, the control device determines whether or not answer from a remote terminal has been made, for example, by detecting whether or not the polarity of the line has been inverted. If the answer in step S4 is no, the program returns to step S2, whereas if the answer in step S4 is yes, the program proceeds to step S5.

In step S5, the control device reads DTMF control parameters and sets them in the DTMF signal transmission circuit. An example of the DTMF control parameters is shown in FIG. 4 at the right portion thereof. In step S6, it is determined whether or not any one of the dial switches has been input. If the answer in step S6 is yes, the program proceeds to step S7, in which a DTMF signal is transmitted according to the DTMF control parameters set above. In step S8, it is determined whether or not on-hook or line open has been detected. If the answer in step S8 is no, the program returns to step S6, whereas if the answer in step S8 is yes, the program comes to end. Instead of the determination whether or not answer has been made in step S4, a switch for selecting the parameters may be provided in the telephone and it may be determined whether or not this switch has been operated, for example. In this case, the user operates this switch after dialing, and then the control device performs the DTMF control. With the above configuration, the DTMF signal can be transmitted with the parameters different from those upon dialing, so that the DTMF signal can be reliably detected by the remote device.

Figure 3:
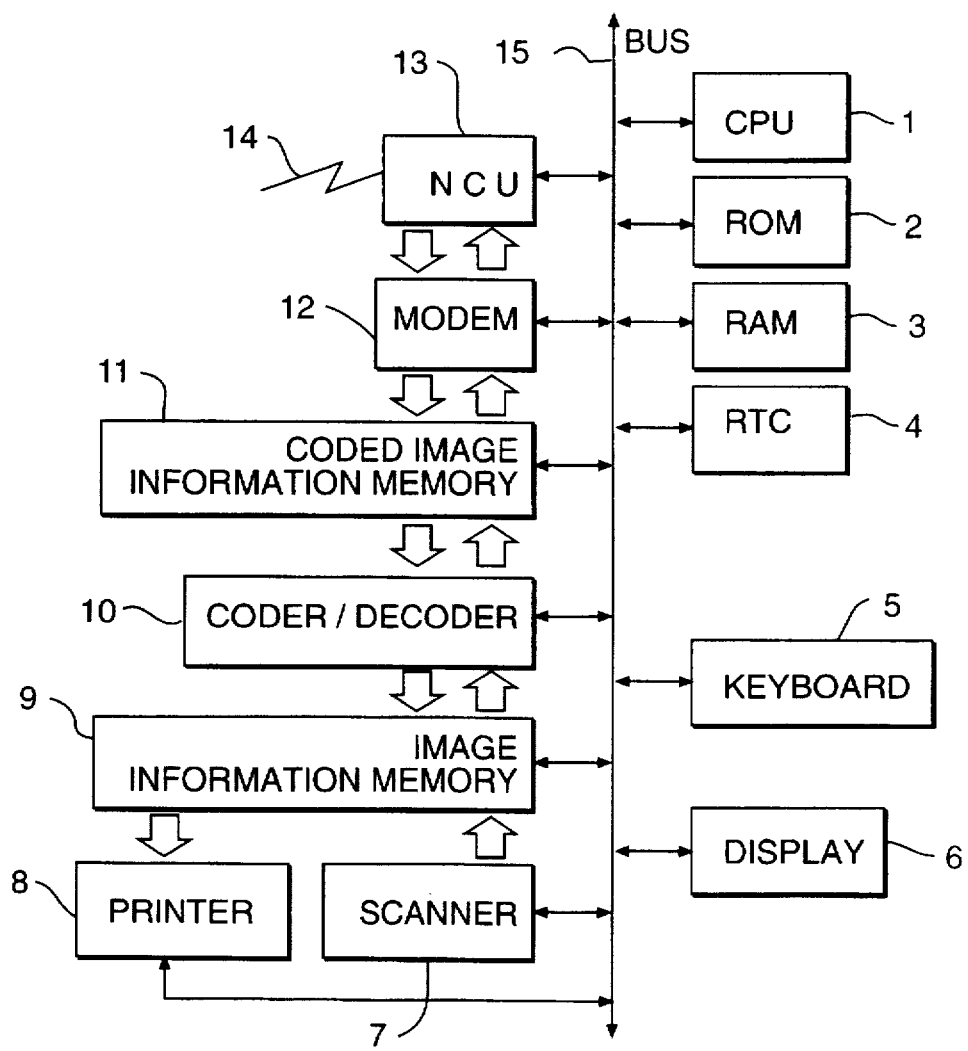
FIG. 3 is a block diagram showing the configuration of a facsimile device according to a second preferred embodiment of the present invention.

FIG. 3 is a block diagram showing the configuration of a facsimile device according to a second preferred embodiment of the present invention. A CPU 1 performs a control process for the whole of the facsimile device and a control procedure process for facsimile transmission. A ROM 2 is a nonvolatile memory storing a program for controlling the whole of the facsimile device. A RAM 3 is a memory to be used as a working area for the control program. An RTC 4 is a clock circuit (real time clock). A keyboard 5 is an input device comprising switches mounted on a panel. A display 6 is a device for displaying characters and figures, such as a liquid crystal display (LCD). A scanner 7 is a device using a CCD image sensor or the like for reading an original to be transmitted. A printer 8 is a device for printing received image data or the like. An image information memory 9 is a large-capacity memory for storing image information. A coder/decoder 10 is a circuit for coding (compressing) and decoding (expanding) image information. A coded image information memory 11 is a memory for storing coded image information. A modem 12 is a modulator/demodulator having a function as a low-speed modem (V21) for a facsimile transmission control signal and a function as a high-speed modem (V27ter, V29, V33, V17, etc.) for transmission and receiving of image information. This modem 12 also has a function of transmitting and receiving a DTMF signal (PB signal) and can control a transmission signal level. This function is used not only in transmission and receiving of a command by the DTMF signal, but also in dialing to a PB line. An NCU 13 is an interface circuit for interconnecting the facsimile with a telephone network or ISDN, and has an automatic transmitting and receiving function. Reference numeral 14 denotes a subscriber line connected to a communication network. A bus 15 functions to transfer data between the circuits in the facsimile device. The heavy arrows in FIG. 3 indicate the flows of image information.

Figure 6:
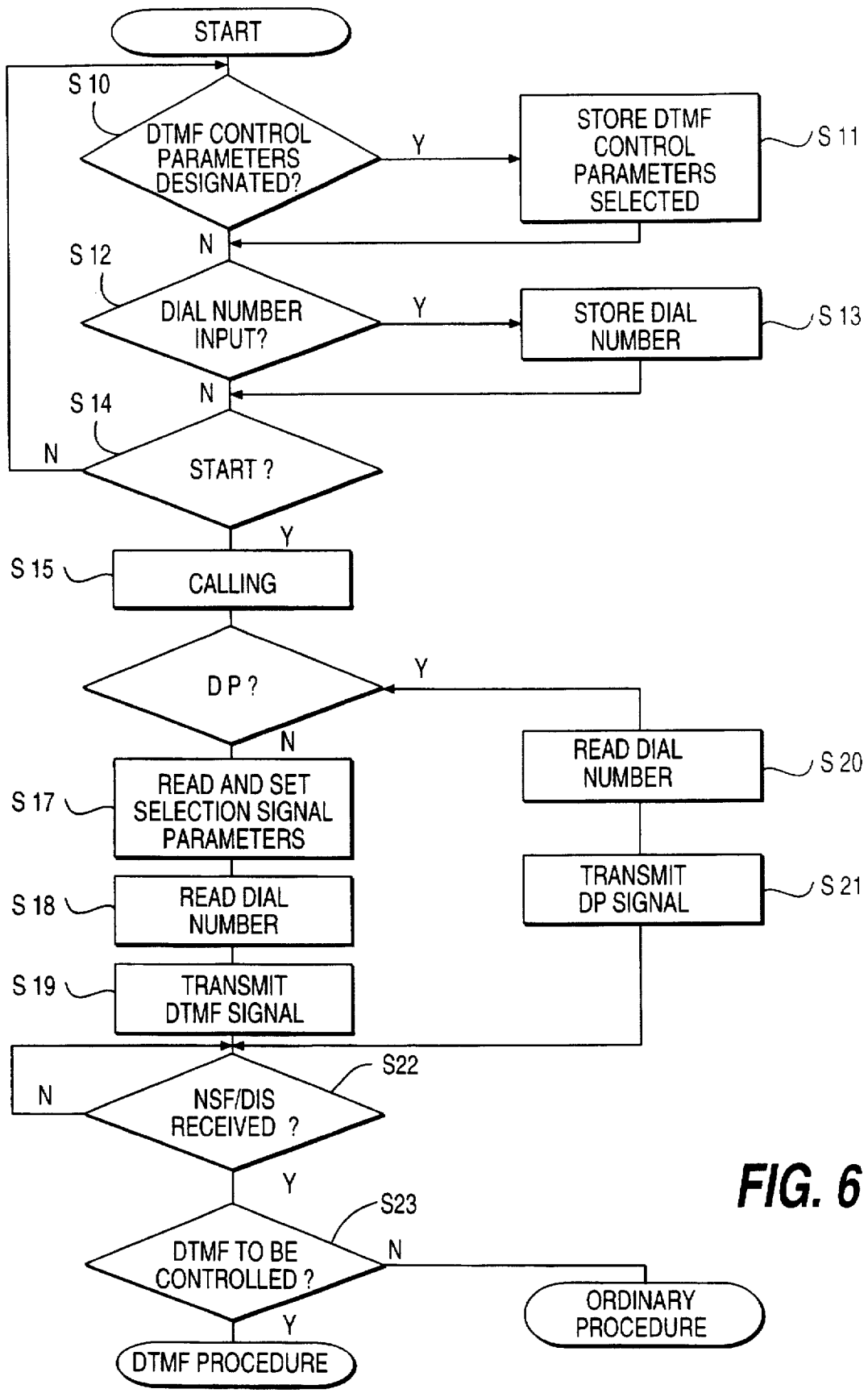
FIG. 6 is a flowchart showing a calling process of a facsimile device according to the second preferred embodiment of the present invention.

The operation of the second preferred embodiment will now be described. FIG. 6 is a flowchart showing a calling process for the facsimile device to which the present invention is applied. In step S10, it is determined whether or not the keyboard has been operated to designate and select DTMF control parameters. If the answer in step S10 is yes, the program proceeds to step S11, in which the DTMF control parameters selected above are stored. FIG. 5 shows an example of plural sets of DTMF control parameters preliminary stored in the memory. The operator may designate and select any one of the plural sets of DTMF control parameters shown in FIG. 5 by operating the keyboard.

In step S12, it is determined whether or not a dial number has been input. If the answer in step S12 is yes, the program proceeds to step S13, in which information of the input dial number is stored. If the input dial number is an abbreviated number, an actual dial number corresponding to the abbreviated number is read from an abbreviated dial list and is then stored. In step S14, it is determined whether or not calling is to be started by determining whether or not a start switch has been depressed, for example. In step S15, the NCU is controlled to close the line, thereby originating a call. In step S16, it is determined whether or not the kind of a dial signal on the line is DP (dial pulse). If the answer in step S16 is yes, the program proceeds to step S20, in which the dial number stored in step S13 is read. In step S21, a DP signal is transmitted according to the dial number read in step S20. The kind of the dial signal on the line is preliminarily set by the operator and is stored in the memory.

If the answer in step S16 is no, the program proceeds to step S17, in which a set of selection signal parameters is read and set into the signal transmission control means. In step S18, the dial number is read, and in step S19, a DTMF signal is transmitted according to the parameters set in step S17. In step S22, the receiving of an NSF/DIS signal from the remote device is awaited, and in step S23, it is determined whether or not a DTMF procedure is to be executed. For example, this determination may be effected by determining whether or not a code to be transmitted is set in a DTMF code storing section (not shown). If the answer in step S23 is no, an ordinary facsimile procedure is executed, whereas if the answer is yes, the program proceeds to the DTMF procedure.

Figure 7:
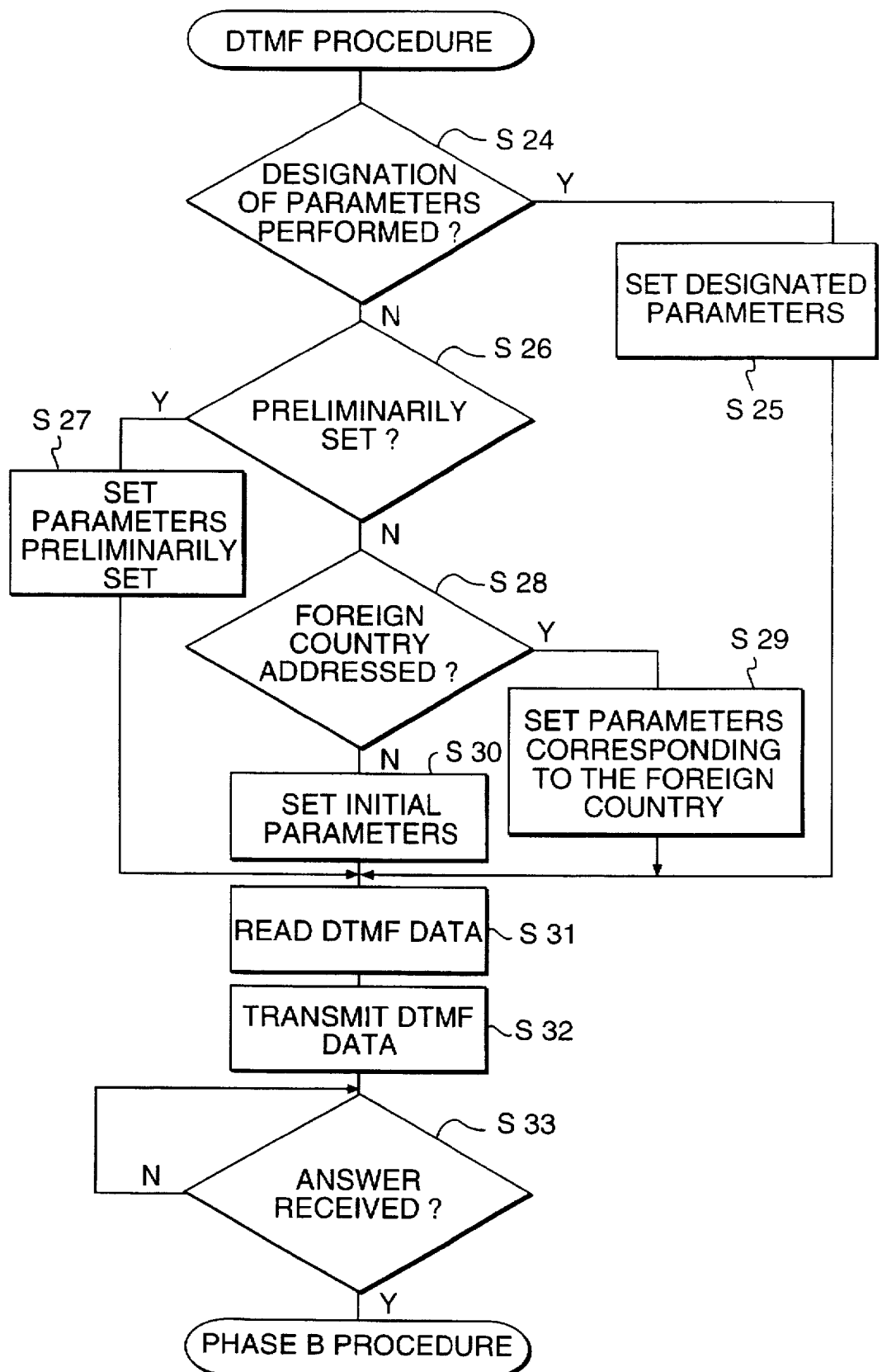
FIG. 7 is a flowchart showing a DTMF procedure process.

FIG. 7 is a flowchart showing the process of the DTMF procedure. In step S24, it is determined whether or not the designation of the parameters in steps S10 and S11 has been performed. If the answer in step S24 is yes, the program proceeds to step S25, in which the set of parameters designated is read and set into the signal transmission control means. In step S26, it is determined whether or not a set of DTMF control parameters is preliminarily set, for example, by determining whether or not the set of parameters is recorded for abbreviated dialing or in an abbreviated dialing memory. If the answer in step S26 is yes, the program proceeds to step S27, in which the set of parameters preliminarily set above is set into the signal transmission control means. In step S28, it is determined whether or not a destination address is a foreign country. For example, this determination may be effected from a telephone number. If the answer in step S28 is yes, the program proceeds to step S29, in which a set of parameters corresponding to the foreign country or area is set by referring to a country-parameters set table preliminarily stored.

If the answer in step S28 is no, the program proceeds to step S30, in which a set of initial parameters is set. The set of initial parameters is one as shown in FIG. 4 at the right portion thereof, which is necessarily different from the set of selection signal parameters. In step S31, a DTMF code data to be transmitted is read from the DTMF code storing section, and in step S32, a DTMF signal corresponding to the data read above is transmitted according to the parameters set above. In step S33, an answer signal from the remote device is awaited, and the program proceeds to an ordinary phase B procedure. Such a process allows transmission of the DTMF signal with optimum parameters for the remote device.

Having thus described the specific preferred embodiments, the following modifications according to the present invention may be made.

In the above preferred embodiments, the DTMF code information and the dial number are stored separately from each other. In modification, the telephone number and the DTMF code may be stored in series with a delimiter interposed therebetween in the abbreviated dial list. Then, the digits preceding the delimiter may be read as the dial number, and the digits succeeding the delimiter may be read as the DTMF code. The application of the present invention is not limited to the telephone and the facsimile device, but may be expanded to various general devices for transmitting and receiving a dual-tone multiple frequency signal through a communication line, such as a remote supervisory control device using a telephone line.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A communication device comprising:

means for inputting code information for a call to be transmitted through a communication network;

means for transmitting dual-tone multiple frequency (DTMF) signals to the communication network according to said code information, wherein a DTMF signal is transmitted according to at least one of a plurality of signal parameters, including a signal transmission time parameter and a signal pause time parameter, upon the execution of a dialing input to the communication network; and means for controlling transmission of the DTMF signals so that the at least one of a plurality of signal parameters is made different for a DTMF signal transmitted during the call by the means for transmitting after the execution of the dialing input to the communication network.

2. A communication device according to claim 1, wherein the signal parameters further include a signal transmission level parameter and further comprising means for storing a plurality of sets of parameters, each set of parameters comprising at least one of said signal transmission time, said signal pause time, and said signal transmission level parameters; and means for selecting one of said plurality of sets of parameters for use in transmission of the DTMF signal.

3. A communication device comprising:

means for inputting code information for a call to be transmitted through a communication network;

means for transmitting dual-tone multiple frequency (DTMF) signals to the communication network according to said code information, wherein a DTMF signal is transmitted according to a set signal transmission level upon the execution of a dialing input to the communication network; and means for controlling transmission of the DTMF signals so that the signal transmission level is made different for a DTMF signal transmitted during the call by the means for transmitting after the execution of the dialing input to the communication network.

* * * * *